United States Patent [19]

Whitten et al.

[11] Patent Number: 4,602,524
[45] Date of Patent: Jul. 29, 1986

[54] METHOD OF MANUFACTURING BICYCLE CHAIN DRIVES

[75] Inventors: Cyrus M. Whitten, Clarksville, Tenn.; Edward M. Hilger, Fort Wayne, Ind.

[73] Assignee: General Signal Corporation, Stamford, Conn.

[21] Appl. No.: 672,981

[22] Filed: Nov. 19, 1984

[51] Int. Cl.$^4$ .................. G05G 1/14; B21K 1/04
[52] U.S. Cl. ........................... 74/594.2; 29/6; 72/377
[58] Field of Search ............ 29/6, 432, 525; 72/377; 74/594.1, 594.2, 594.4

[56] References Cited

U.S. PATENT DOCUMENTS

| 596,846 | 1/1898 | Brown | 74/594.2 |
|---|---|---|---|
| 624,635 | 5/1899 | Fauber | 74/594.2 |
| 643,349 | 2/1900 | Fauber | 74/594.2 |
| 2,182,958 | 12/1939 | Bullock | 29/6 |
| 2,257,401 | 9/1941 | Schwinn | 74/594.2 X |
| 3,608,184 | 9/1971 | Thun | 29/6 X |
| 3,835,729 | 9/1974 | Tarutani | 74/594.2 X |
| 3,906,811 | 9/1975 | Thun | 74/594.2 X |
| 4,183,262 | 1/1980 | Segawa | 74/594.2 |

Primary Examiner—Charlie T. Moon
Attorney, Agent, or Firm—Jeffrey S. Mednick; William G. Miller

[57] ABSTRACT

A process for manufacturing a bicycle chain drive which utilizes a crank which is cold formed as a single piece with integral splines for engaging a sprocket wheel when the sprocket wheel is mounted in driving relationship with the crank. A cold forming process which can be used for producing the crank includes several stages of upsetting to form the journals, the splined sprocket flange, and an adjoining collar for aligning the sprocket. After those elements have been formed the pedal receiving ends are formed by another upsetting process after which they are drilled and tapped. Then the arms are bent to form the finished crank which is assembled to the sprocket.

8 Claims, 9 Drawing Figures

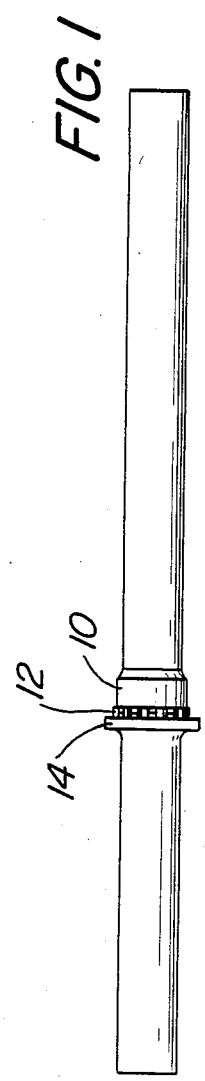
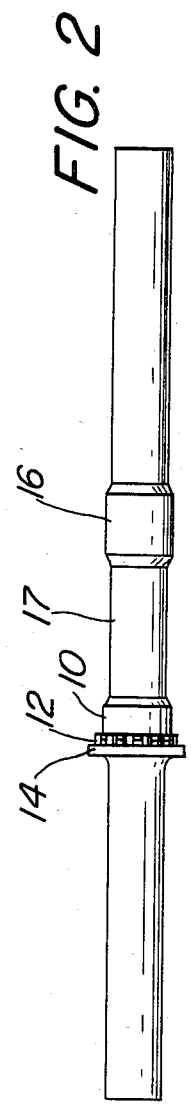
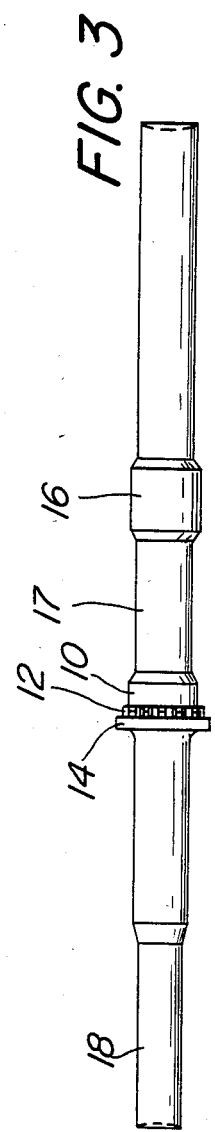

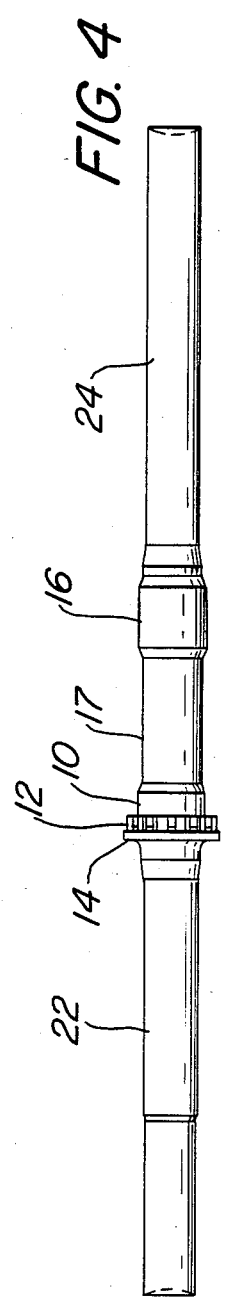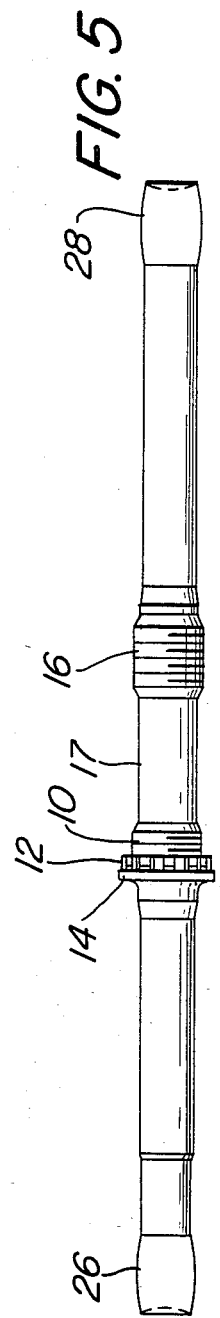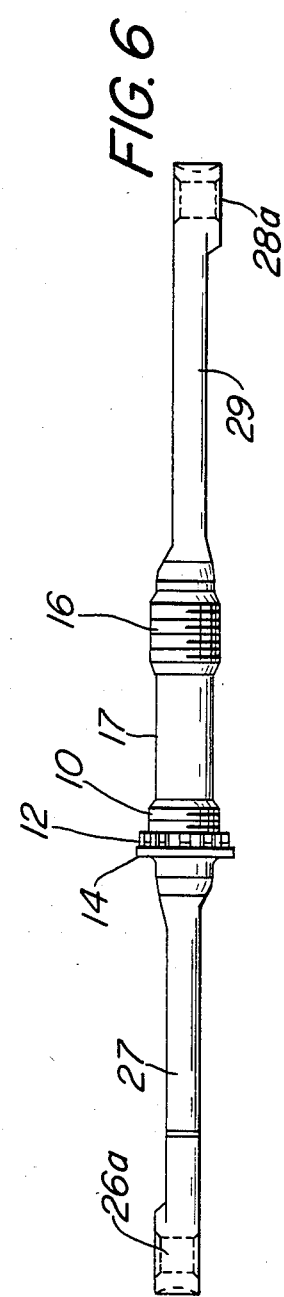

METHOD OF MANUFACTURING BICYCLE CHAIN DRIVES

BACKGROUND OF THE INVENTION

This invention relates to a method for manufacturing a bicycle chain drive. More particularly, this invention relates to a method for producing a novel bicycle crank and a novel crank and sprocket wheel assembly to form a chain drive which will provide a strong drive means while also being easier and less expensive to manufacture and assemble.

Typically, a sprocket wheel serves as the driving member in a chain drive for a bicycle. The sprocket wheel is normally driven by pedals through a crank made up of a pair of crank arms and an associated crank shaft connecting those arms. The crank is fastened to the sprocket on the right side of the bicycle and the crank shaft is suitably mounted in a bearing assembly supported in a housing incorporated as part of the bicycle frame.

Cranks have been fabricated in a number of different ways. Conventional methods of fabrication include the mounting of separate crank arms on a crank shaft, forming one crank arm as a part of the crank shaft with the other arm being detachably mounted to the shaft, drop forging the crank as a single piece, and cold forging as a single piece.

The cold forging process has been found advantageous in that it minimizes material scrap, provides close tolerances and results in higher strength while eliminating expensive secondary operations. In the past, cold formed cranks have been designed to drive the sprocket through a pin which is pressed into one of the crank arms, as shown in FIG. 4 of U.S. Pat. No. 3,608,184. This method of driving the sprocket, however, has been found to be less than optimum, for the pin has been found to be the weakest element of the sprocket drive. In addition the assembly of the sprocket wheel and crank is a three part operation since it involves the pressing of the pin into the appropriate crank arm prior to the mounting of the sprocket on the crank.

Other methods of driving the sprocket have been used in connection with cranks made up of a number of pieces and formed by other than the cold forging process. For example, U.S. Pat. No. 3,347,112 shows the use of a sprocket mounting segment which has a polygonal cross section. Such an arrangement is also suggested in U.S. Pat. No. 3,906,811 which describes mounting a sprocket by press fitting it onto a serrated collar which is part of a crank arm. Still another method shows a spline arrangement (U.S. Pat. No. 3,377,883). In the splined arrangement the splines are on a separate sleeve, which is in frictional engagement with the crank shaft.

The prior art methods described above all have disadvantages in that they do not minimize the number of parts to be assembled in manufacturing the crank and sprocket drive while at the same time providing a strong drive structure.

It is an object of this invention to provide a method for manufacturing a bicycle chain drive which is capable of producing a strong drive means for the chain while at the same time minimizing the number of parts which must be assembled and thus minimizing both the amount of labor involved in the manufacturing process and the cost of manufacture.

It is also an object of this invention to provide a method for manufacturing a bicycle crank having a minimum number of parts while also providing maximum strength and ease of manufacture.

SUMMARY OF THE INVENTION

The objects of this invention have been achieved by cold forming a crank as a single piece with integral splines to engage the sprocket wheel when it is mounted in driving relationship with the crank. A cold forming process which can be used for producing the crank includes several stages of upsetting to form the journals, the splined sprocket flange, and an adjoining collar for aligning the sprocket. After those elements have been formed the pedal receiving ends are formed by another upsetting process after which they are drilled and tapped. Then the arms are bent to form the finished crank which is assembled to the sprocket.

BRIEF DESCRIPTION OF THE DRAWINGS

The present invention is shown in the following figures in which like reference characters refer to like parts:

FIGS. 1–6 show rod stock in the various stages of cold forming which make up the process of the present invention.

DESCRIPTION OF THE PREFERRED EMBODIMENT

In producing a bicycle crank in accordance with the present invention, it is necessary first to cut off a piece of rod stock to the right length. This stock may, for example, be of S.A.E. 1010 steel. This stock is then cold formed by the procedures set forth below by way of example.

Figure 8:
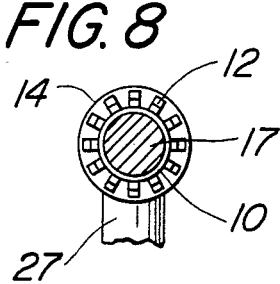
FIG. 8 is a cross section taken along 8—8 in FIG. 7 to show the structure of the splines.

First, as shown in FIG. 1, the stock is upset to form a journal 10 which is flanked on the outside by a sprocket flange 12, splined as shown in detail in FIG. 8, and flanked on its outside by a collar 14. As is known by those skilled in the art, the upsetting process involves holding the stock in a die designed to form the shapes desired and then applying axial pressure to the end of the stock sufficient to cause the stock to cold form to fit the shape of the die. As a result of the upsetting process the length of the stock is reduced in relation to the increase in diameter realized. The journal 10 will, of course, be used to carry a bearing cone. The splined sprocket flange 12 will transmit the driving force from the pedals to a sprocket having a central aperture whose shape will mate with the splined sprocket flange. The collar 14 will serve as a means for retaining and aligning the sprocket when the sprocket is appropriately mounted on the sprocket flange 12 abutting the collar 14.

The next step in the process, as shown in FIG. 2, is another upsetting operation. The purpose of this operation is to form the second journal 16. The journal 16 in combination with the journal 10, the flange 12, and the collar 14 along with the intervening length of stock 17 make up the crank shaft itself with the portions outboard from those elements eventually forming the crank arms. The journal 16 is spaced from the journal 10 as may be required by the size of the bearing assembly for the crank and its supporting housing. The journal 16 is necessarily smaller in diameter than the journal 10 in order that the bearing cone to be mounted on the journal 10 can be passed over the journal 16 in assembly. As was the case with the previous step, this last upsetting operation likewise decreases the length of the stock.

The next step is shown in FIG. 3. This step may be one of a series of two steps in which the stock is forward extruded to appropriately size the crank arms. In FIG. 3, the extruded length is shown as 18.

A further extrusion is carried out, as shown in FIG. 4, where the lengths 22 and 24 are extruded and result in further lengthening the stock.

The journals 10 and 16 can then be burnished in preparation for the rolling of the threads on the journals. This forming step, as with all other steps in this process, is carried out as a cold forming process.

In order to prepare the extreme ends of the crank arms for the mounting of the pedals the ends are upset to a barrel shape, as shown at 26 and 28 in FIG. 5. The ends are then coined as shown in FIG. 6 as 26a and 28a. Also one surface of each arm, 27 and 29, is flattened, as shown in FIG. 6. This flattening is mainly for cosmetic purposes and is not one of the necessary steps of the process.

Figure 7:
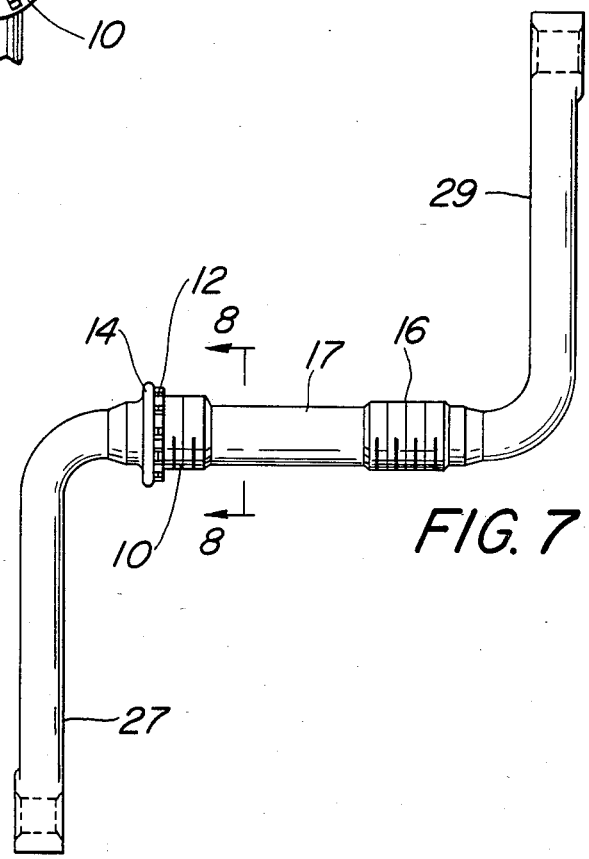
FIG. 7 shows the completed crank with a mounted sprocket shown in phantom.

After the flattening of the arms the extreme ends are drilled, tapped and countersunk to form the pedal eyes which will receive the pedals during assembly of the bicycle. The process of manufacture is then complete except for the bending of the arm portions of the crank to approximately right angles with the crank shaft, as shown in FIG. 7. During assembly the sprocket 30 will be assembled in the position shown in phantom in FIG. 7 so that the sprocket engages the splines of sprocket flange 12 with the mating shape of its central aperture. An advantageous spline arrangement is shown in FIG. 8, which is a section taken along 8—8 of FIG. 7.

It should be noted that the changes in diameter shown in FIGS. 3 and 4 due to the extrusion steps illustrated in those figures have been emphasized for purposes of clarity. Those diameter changes may be quite small and may not be readily evident from a visual observation of the finished crank. Thus, the differences in diameter resulting from the extrusions has not been emphasized in FIG. 7, which shows the finished product.

Figure 9:
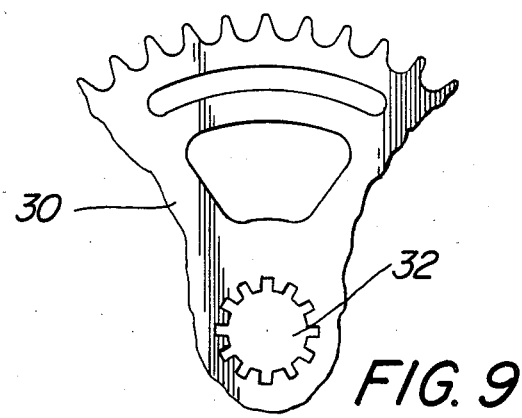
FIG. 9, is a section of a sprocket designed to mate with the crank of FIG. 7.

In FIG. 9 there is shown a section of a sprocket 30 which has a splined central aperture 32 designed to mate with the splined flange 12 of the crank, as shown in FIG. 8. The sprocket is easily assembled to the crank for the mating splines are designed to require little in the way of positioning in order for the sprocket to be positioned on the splined flange of the crank against the inside shoulder of the collar 14 as shown in FIG. 7.

As will be evident, the above described process produces a strong bicycle chain drive which can be manufactured and assembled with less effort and time than would be required with the prior art arrangements.

What is claimed is:

1. A process for making from steel rod stock a bicycle crank having two crank arms connected by a crank shaft and having means arranged to engage a sprocket wheel in driving relationship with the crank, comprising the step of:

cold forming a single piece of said rod stock to form said crank by forming two crank arms and cold forging a connecting crank shaft, with integral splines on said crankshaft for engaging said sprocket wheel.

2. A process for making from steel rod stock a bicycle crank having two crank arms connected by a crank shaft and having means arranged to engage a sprocket wheel in driving relationship with the crank, comprising the steps of:

cold forging a central position of said rod stock to form spaced journals with one of said journals being flanked on its outside by a sprocket flange which is splined to engage said sprocket wheel and said flange being flanked on its outside by a collar adjacent said flange to provide a shoulder for aligning an abutting sprocket wheel;

rolling threads on said journals so that they will accept bearing cones thereon;

flattening the extreme end portions on the rod;

forming threaded pedal eyes in said extreme end portions to accept the mounting of pedals; and bending those rod portions lying outward of said collar and journals in opposite directions to positions approximately at right angles to the central portion, whereby said central portion with said collar, said flange, and said journals form the crank shaft and the oppositely disposed rod portions form the crank arms.

3. A process for making from steel rod stock a bicycle crank having two crank arms connected by a crank shaft and having means arranged to engage a sprocket wheel in driving relationship with the crank, comprising the steps of:

starting with an appropriate length of said rod stock;

upsetting said rod stock to cold from a first journal as part of a shaft for said crank and to also cold form a splined sprocket flange adjacent and outboard of said journal as well as a collar positioned on the other side of said splined sprocket flange from said journal to form a shoulder against which to abut the sprocket wheel when it is assembled to the crank;

further upsetting said rod to form a second journal spaced from said first journal as required by the spacing between any bearings supporting said crank;

forward extruding that part of said rod which is to become the crank arms;

burnishing said journals;

rolling threads on said first and second journals;

upsetting the extreme end regions of said rod to form a larger diameter region on both ends in order to better accommodate the threaded ends of the pedals;

bending those portions lying outward from said journals in opposite directions to form crank arms approximately at right angles to said crank shaft; and drilling and tapping said end regions to form pedal eyes.

4. A process for making from steel rod stock a bicycle crank having two crank arms connected by a crank shaft and having means arranged to engage a sprocket wheel in driving relationship with the crank, comprising the steps of:

cold forging from a single piece of said rod stock the shaft for said crank so that it will have a pair of spaced journals with one of said journals being flanked on its outside by a splined sprocket flange for engaging said sprocket wheel and said flange being flanked on its outside by a collar for retaining said sprocket wheel on said flange;

cold forming on the extreme ends of said single piece of stock pedal eyes threaded to accept pedals; and cold forming arms for said crank by bending the opposite ends of said stock in opposited directions just outboard of said shaft and at right angles to said shaft.

5. A process for making from steel rod stock a chain drive for a bicycle having a crank with two crank arms connected by a crank shaft and having a sprocket wheel in driving relationship with the crank, comprising the steps of:

cold forming a single piece of said rod stock to form said crank by forming two crank arms, and cold forging a connecting crank shaft with integral splines on said crankshaft engaging said sprocket wheel; and mounting said sprocket wheel on said splines.

6. A process for making a bicycle chain drive comprising the steps of:

cold forging from a single piece of steel rod stock a shaft for a crank having a pair of spaced journals with one of said journals being flanked on its outside by a splined sprocket flange and said flange being flanked on its outside by a collar;

cold forming on the extreme ends of said single piece of stock pedal eyes threaded to accept pedals;

cold forming arms for said crank by bending the opposite ends of said stock in opposited direction just outboard of said shaft and at right angles to said shaft; and mounting a sprocket wheel on said splined sprocket flange in abutment to said collar.

7. A one-piece steel rod bicycle crank comprising:

two crank arms cold formed to a desired length;

a crank shaft cold forged to connect said crank arms, and;

means for engaging a sprocket wheel in driving relationship with the crank, said means including splines cold forged as an integral part of said crank.

8. A one-piece steel rod bicycle crank comprising:

two crank arms cold formed to a desired length; and a crank shaft cold forged to connect said crank arms, said shaft including spaced journals with threads rolled thereon, a sprocket flange flanking one of said jounrals on the outside, said flange being splined to engage a sprocket wheel, and a collar flanking said flange on the outside and adjacent to said flange to provide a shoulder for aligning an abutting sprocket wheel, and means for engaging a sprocket wheel in driving relationship with the crank, said means including splines cold forged as an integral part of said crank.

* * * * *